No. 822,322. PATENTED JUNE 5, 1906.
E. THOMSON & A. A. BALL, Jr.
ENGINE.
APPLICATION FILED MAY 19, 1902.

6 SHEETS—SHEET 2.

Witnesses:
Marcus L. Byng.
Alex F. Macdonald.

Inventors.
Elihu Thomson,
Augustus A. Ball, Jr,
By Albert G. Davis Atty.

No. 822,322. PATENTED JUNE 5, 1906.
E. THOMSON & A. A. BALL, Jr.
ENGINE.
APPLICATION FILED MAY 19, 1902.

6 SHEETS—SHEET 5.

Witnesses:
Marcus L. Byng.
Alex F. Macdonald.

Inventors.
Elihu Thomson,
Augustus A. Ball, Jr,
By Att'y.

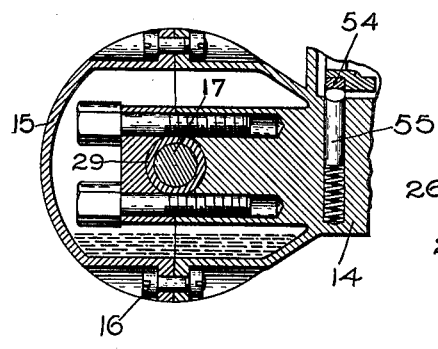
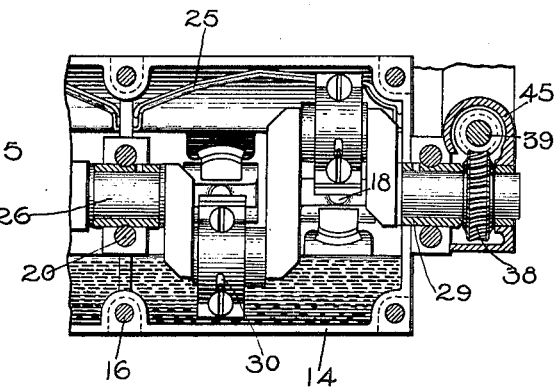
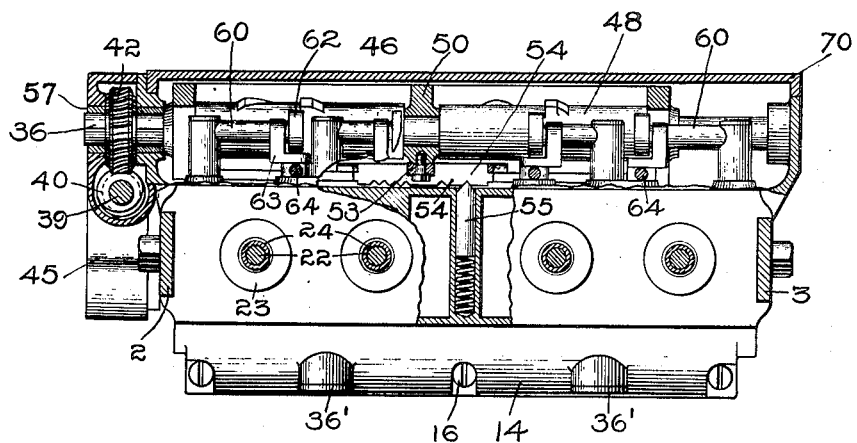

UNITED STATES PATENT OFFICE.

ELIHU THOMSON, OF SWAMPSCOTT, AND AUGUSTUS A. BALL, JR., OF LYNN, MASSACHUSETTS, ASSIGNORS, BY DIRECT AND MESNE ASSIGNMENTS, TO GENERAL ELECTRIC COMPANY, A CORPORATION OF NEW YORK.

ENGINE.

No. 822,322.   Specification of Letters Patent.   Patented June 5, 1906.

Application filed May 19, 1902. Serial No. 107,915.

*To all whom it may concern:*

Be it known that we, ELIHU THOMSON, residing at Swampscott, and AUGUSTUS A. BALL, Jr., residing at Lynn, county of Essex, State of Massachusetts, citizens of the United States, have invented certain new and useful Improvements in Engines, of which the following is a specification.

The present invention relates to fluid-pressure engines, and more especially to those designed for automobiles.

It is important that engines of this class be so arranged that they may be taken down wholly or in part and reassembled by relatively unskilled persons. The parts should be simple in construction and of such a nature that repairs thereon can be made in an ordinary machine-shop and by the average mechanic. It is furthermore highly desirable to so arrange the parts that the engine as a whole is divided into sections, since by so doing the highly-heated parts may be prevented from imparting their heat to the bearings, and such a construction also permits using materials of different specific gravity, strength, and physical properties. Again, this separation has the advantage of preventing any distortion of the parts, which is liable to occur where superheated steam is used, and the crank-case and moving parts are more or less subjected to the heat from the cylinder or cylinders and the exhaust-steam. It is also of importance to inclose the working parts in such manner that they may be continuously lubricated, and this without thought on the part of the operator. Another important feature is to provide means for supporting the engine and securing the parts together, so that the alinement is at all times preserved both with respect to the parts of the engine and also with respect to the shaft or shafts driven thereby.

The object of our invention is to provide an engine having the desirable features above mentioned, while eliminating the objections which are found in the commercial engine of to-day. For a description of what we consider to be novel and our invention attention is called to the description and claims appended thereto.

Figure 1:
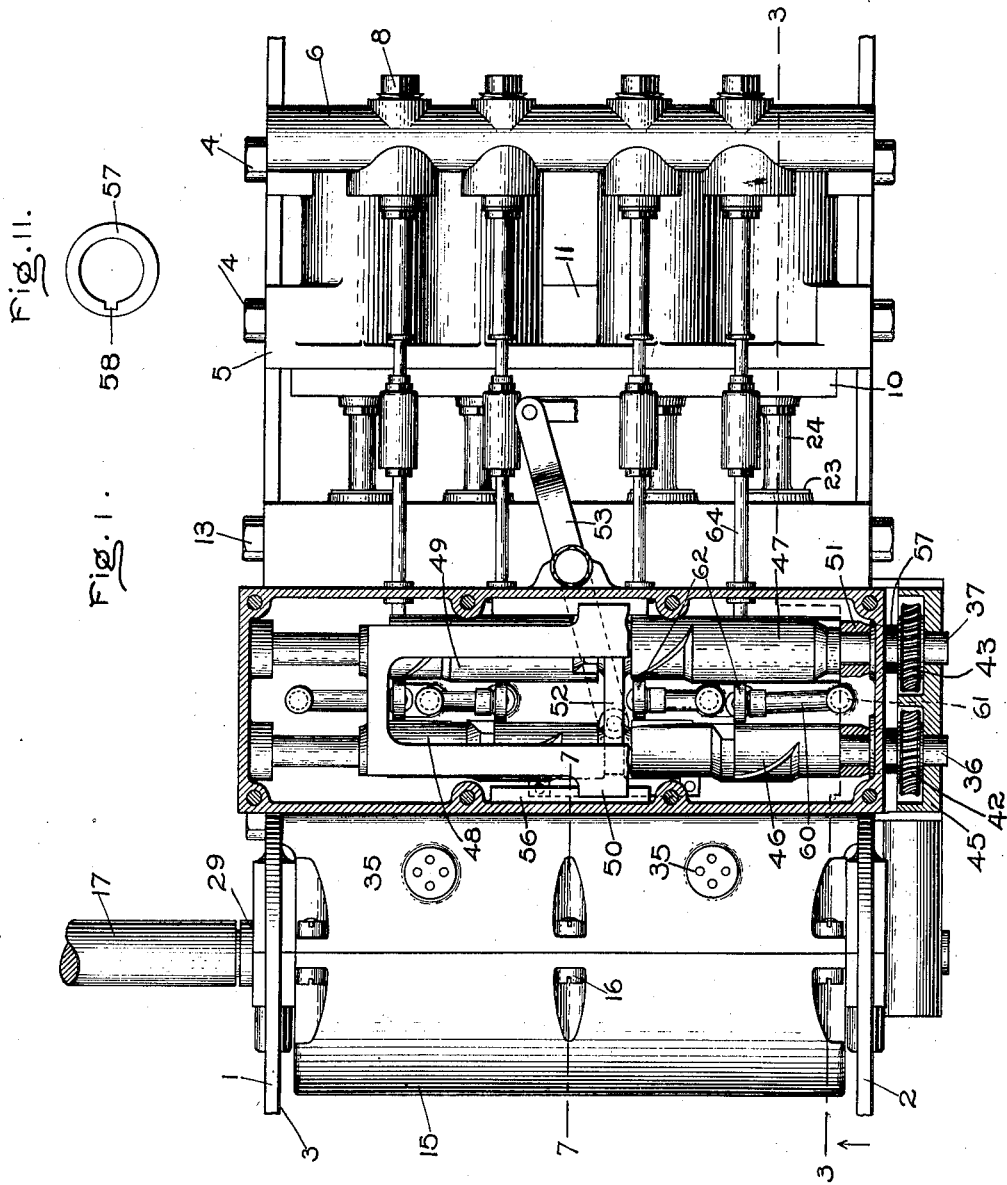
Figure 2:
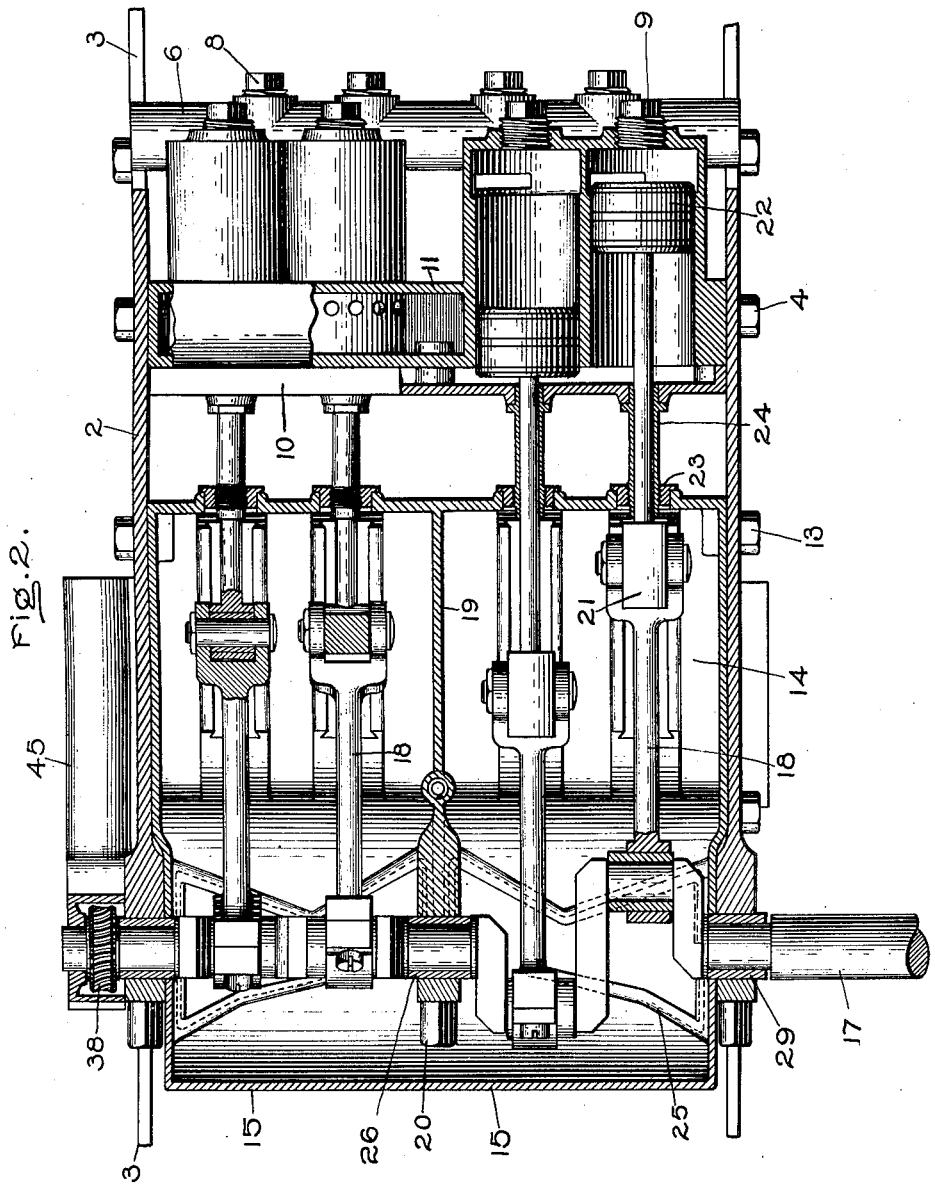
Figure 3:
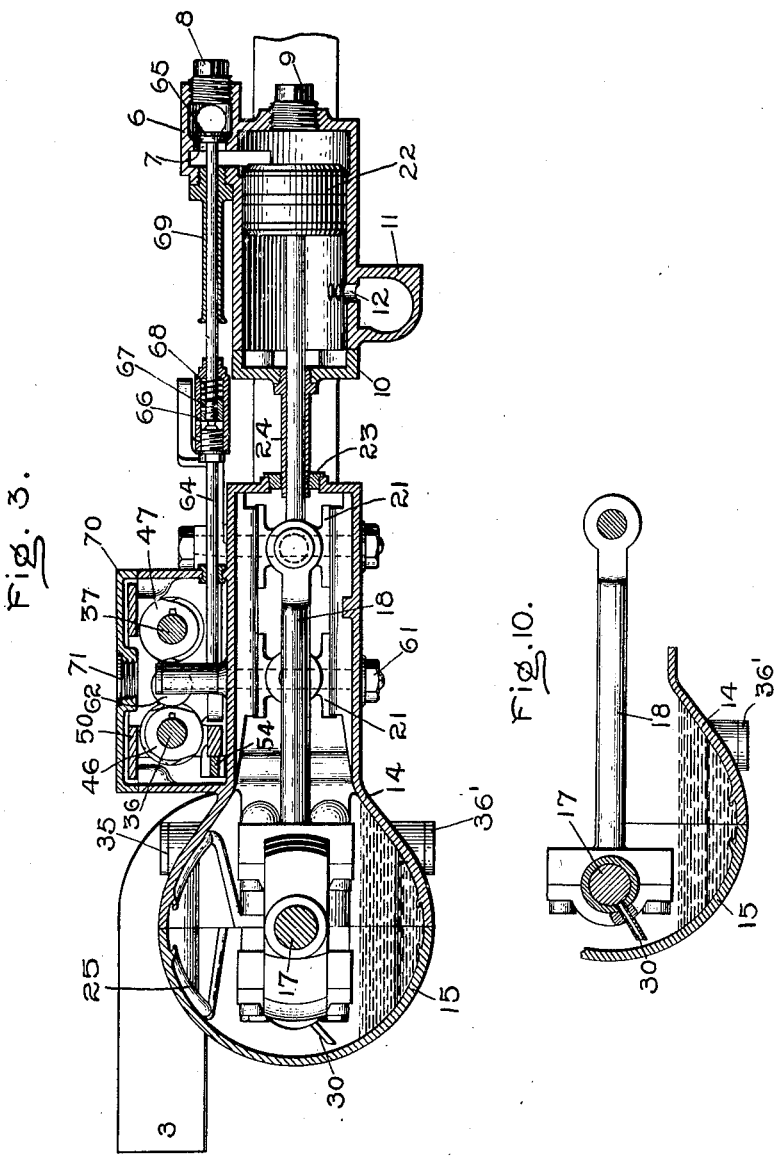
Figure 4:
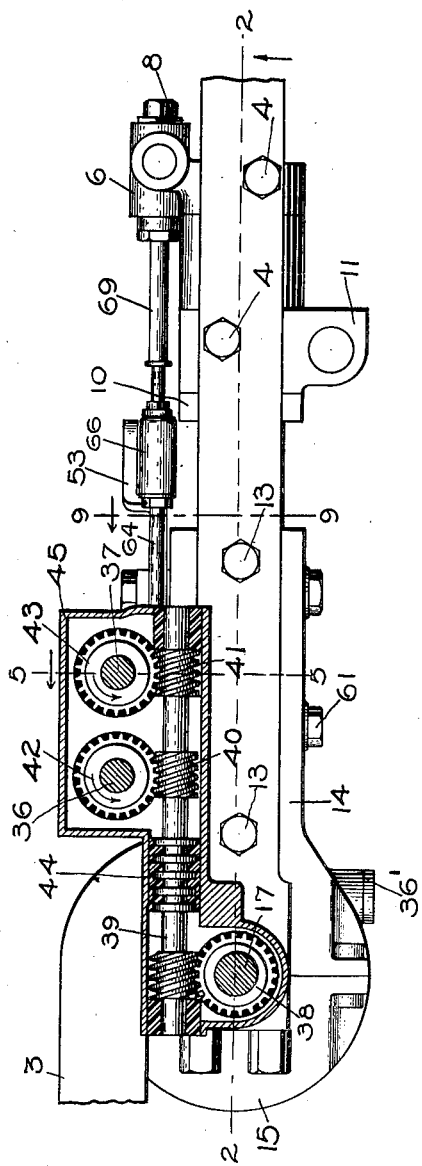
Figure 5:
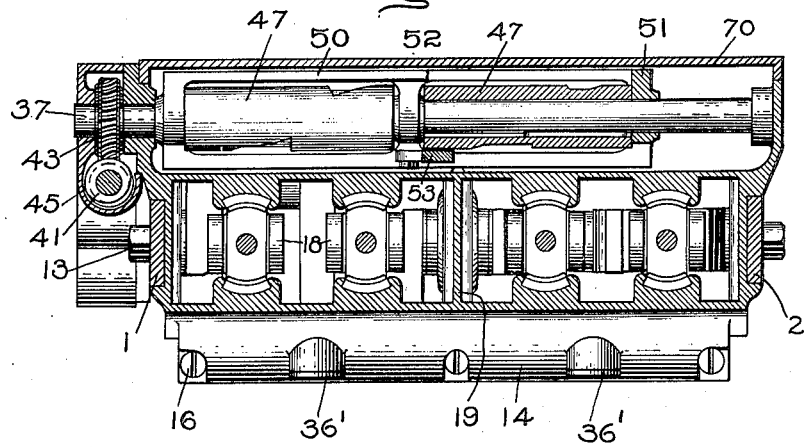
Figure 6:
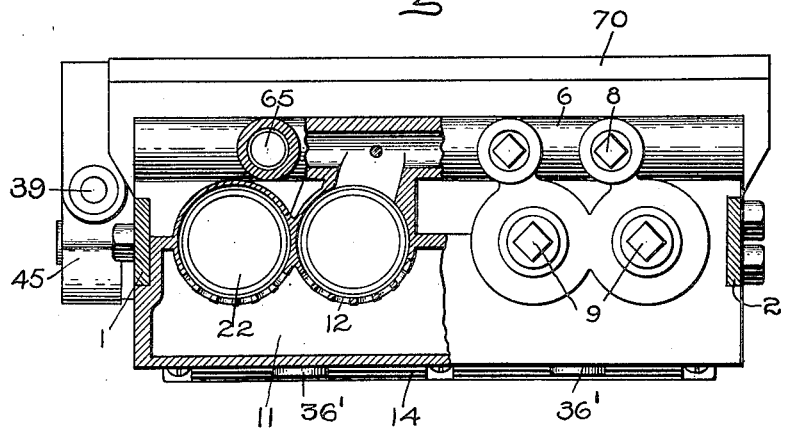

In the accompanying drawings, which represent an embodiment of our invention, Figure 1 is a plan view of a four-cylinder single-acting engine with certain of the parts in section. Fig. 2 is a transverse section as viewed from underneath. Fig. 3 is a longitudinal section. Fig. 4 is a side elevation with certain of the parts in section. Fig. 5 is a cross-section taken on line 5 5 of Fig. 3. Fig. 6 is an end elevation viewed from the cylinder end with certain of the parts in section. Fig. 7 is a detail sectional view of the intermediate bearing of the crank-shaft. Fig. 8 is a partial end view of the crank, a part of the inclosing case having been removed. Fig. 9 is a cross-section showing the means employed to actuate the valve mechanism. Fig. 10 is a detail view of the means employed to lubricate the connecting-rod, and Fig. 11 is a side elevation of one of the cam-shaft bushings.

Referring more particularly to Figs. 1 and 2, the reference-numerals 1 and 2 represent side plates or supports which hold the parts of the engine together, as will hereinafter appear. It is desirable, although not necessary, to make these side plates out of steel and to extend them, as shown at 3, to form supports for the engine. In the case of a vehicle these extensions are bolted or otherwise secured to the frame, which frame may be independent of the vehicle-body or form a part thereof, as is desired.

The present embodiment of our invention illustrates a four-cylinder single-acting engine; but it is to be understood that many of the features are applicable to engines having one or a plurality of cylinders.

In order to avoid undue heating of the working parts and also to take the strains off of the cylinder and preserve the alinement of the parts, we prefer to form the cylinders in a separate piece and to secure them to the side frames 1 and 2 by bolts 4. The cylinders may be cast in a single unit or made separately and properly bolted together. In order to reduce the strain of the bolts and prevent the parts from getting out of alinement, projections 5 are provided on the cylinders, which extend on each side of the side plates and closely engage therewith. Formed integral with the cylinder or cylinders at one end is a steam-chest 6, and from this steam-chest are valve-openings 7, Fig. 3, leading to the cylinder. The steam-chest serves also as a means for strengthening the cylinder structure, and thereby preventing distortion. Opposite each of the admission-valves is a screw-threaded plug 8, by means of which the valve may be inspected or removed. The end of each cylinder is provided with a hole for convenience in boring, which hole is normally closed by a screw-threaded plug 9. By removing the plug the interior of the cylinder may be inspected without disturbing the supports. The cylinders open at the lower end into a chamber formed in the transversely-extending piece 10. This piece is secured to the cylinders and forms a support for certain of the parts to be hereinafter described. It also excludes air from the cylinder and prevents the cooling of the walls thereof and also of the piston. This contributes to prevent condensation of the steam, and hence increases the efficiency. In order to remove the cylinders for the purpose of inspection or repair, the valve-stems are uncoupled, the bolts 4 are removed, and also the means employed to unite the cylinders to the transversely-extending piece 10. By reason of this arrangement the piston can readily be exposed to view and also the interior of the cylinder, and this without disturbing any of the adjustments between the parts or removing the engine from the vehicle. Formed integral with the cylinders is an extension 11, containing a chamber into which all of the cylinders exhaust through the openings 12. This extension, in addition to acting as an exhaust-carrying means, serves to hold the cylinders in fixed alinement.

It is to be noted that the steam enters the cylinders at the outer end and passes toward the exhaust, the latter being located at the end adjacent to the crank-case. It will be seen that as the steam sweeps through the cylinders its temperature and pressure are gradually reduced. This arrangement tends to high economy in operation and also reduces the transmission of heat from the cylinder to the bearings. The latter action is further prevented by reason of the air-space or separation between the cylinders and the crank-case.

The cranks and guides are carried in a separate case, which is secured to the side plates 1 and 2 by the bolts 13. By separating the case, guides, and crank from the cylinders we are enabled to keep the temperature of the parts at a low point. It also enables us to use materials of different specific gravity and physical properties for the case and the cylinder. For example, we find it desirable to make the cylinders out of cast-iron and the case out of aluminium, the latter being used on account of its lightness and conductivity. The case is made in two principal parts 14 and 15, the former being bolted to the side plates, while the latter is detachable and is held in place by bolts 16, having slotted nuts. When it is desired to inspect the crank-shaft bearings, the end portion of the case can be removed without disturbing any other portion of the engine. A solid crank-shaft 17 is provided, and to this shaft are secured the connecting-rods 18. Extending longitudinally of the case 14 in a manner to divide it into two compartments is a partition 19, which carries an intermediate bearing for the crank-shaft. The bearing is made in two parts, the detachable part being retained in place by bolts 20. Formed in the case 14 are guides for the cross-heads 21, and these guide are preferably babbitted in order to decrease the friction of the moving parts and to facilitate renewal. The cross-head 21 is preferably formed in one piece with the piston 22, as it avoids joints and decreases the number of parts. The piston is provided with any suitable packing which will withstand high temperatures.

The right-hand end of the crank-case is provided with flanged bushings 23, each having a screw-threaded central opening. The transversely-extending piece 10 is provided with a number of hub-like projections, each projection having a hole to receive the piston-rod and also the sleeve 24, which surrounds the rod and forms a packing therefor. On each sleeve is a collar which engages with a sleeve on the projection of the transversely-extending piece 10. The opposite end of the sleeve is screw-threaded, and engaging therewith is the threaded bushing 23. By adjusting the position of this bushing on the sleeve the crank-case and the cylinders may be held a fixed distance apart and held in rigid relation. It will be seen that the sleeves 24 have a double function—namely, that of a packing for the piston-rod and as separators for the cylinders and crank-case.

The crank-case is intended to be more or less filled with lubricating material, and in order to effectively lubricate the various bearings lubricant-carrying conduits are arranged on the inner wall of the case, a part of these conduits being formed on the cover or detachable portion of the case, the remainder on the fixed portion. In carrying out this feature ribs or projections 25 are formed integral with the case, each of which is grooved in a manner to catch the lubricant as it is splashed around, due to the rotation of the cranks. The grooves or conduits are so arranged that they deliver oil to the crank-shaft and its intermediate bearings 26, Fig. 8, and also to the end bearings 29, which are mounted in that portion of the plates 2 having a greater cross-sectional area than the extensions. Additional means are also provided for lubricating the bearing between the connecting-rod and the crank-shaft. This is clearly shown in Fig. 10, wherein 18 represents the connecting-rod, 17 the crank, 15 the crank-case, and 30 a tube which extends through the bearing-sleeve. As the crank suming that a coupling is about to pass between the jaws, in which event it will be seen that the upper ends of the jaws will first tilt back, that when the coupling is midway between the jaws the latter will then stand substantially square or in their normal positions, and that when the coupling is about to leave the jaws the latter are then tilted in the opposite direction. In this way the jaws are capable of adjusting themselves to enlargements or inequalities in the diameter of the pipe and also to inclined or improper positions of the pipe or well-tubing and that in each instance the jaw will automatically maintain its full bearing or tilting surface in contact with the pipe or well-tube. The gripping-jaws thus constructed can be supported for adjustment in any suitable manner—as, for example, by mounting the said slides in suitable ways on the turn-table and by providing hand-screws E or other like adjusting devices for causing the jaws thus slidingly supported to move either toward or away from the pipe or well-tube. By rotating these hand-screws these jaws can be adjusted into contact with the pipe or well-tube, and when the turn-table is then rotated in the afore-described manner the jaws will grip and rotate the pipe. This rotary movement secures the desired drilling action at the lower end of the pipe or well-tube, and as this drilling action goes on the endless link belt or chain jaws travel on their bearings and permit the pipe to feed or sink gradually downward.

What I claim as my invention is—

1. A rotary well-machine comprising gripping-jaws constructed of endless link belts or chains provided with biting or gripping portions adapted to engage the pipe or well-tube, suitable mountings or supporting members upon which said chains are mounted, and supplemental chains provided with antifriction-rolls, said rolls being interposed between the mountings or supporting members and the chains or link belts which grip the said pipe or tube, substantially as described.

2. In a rotary well-machine, the combination of gripping-jaws formed of endless link belts or chains, suitable mountings or supporting members on which said chains or link belts are mounted, antifriction-rolls interposed between said chains or link belts and said mountings or supporting members, and endless connectors adapted and arranged to connect and carry said antifriction-rolls, substantially as described.

3. In a rotary well-machine, the combination of endless link belt or chain jaws adapted to grip and rotate the pipe or well-tube, and pivoted mountings or supporting members upon which said chains are mounted and springs backing said mounting, the pivots of said mountings or supporting members permitting the jaws to tilt about horizontal axes, substantially as described.

4. In a rotary well-machine, the combination of endless link belt or chain jaws for gripping and rotating the pipe or well-tube, pivoted mountings or supporting members upon which said link belts or chains are mounted, antifriction-rolls for reducing friction between said mountings or supporting members and the said link belts or chains, and endless connectors upon which said antifriction-rolls are mounted, substantially as described.

5. In a rotary well-machine, jaws adapted to grip and rotate said pipe or well-tube and permit the same to automatically feed downward, yielding backings for said jaws, whereby the latter are capable of yielding in order to permit a pipe-coupling or other enlargement to pass between the jaws, substantially as described.

6. In a rotary well-machine, endless link belt or chain jaws adapted to grip and rotate the pipe or well-tube, suitable supporting structures adapted and arranged to carry said chains, and yielding backings which permit the jaws to automatically yield and adjust themselves to enlargements or inequalities in the diameter of the pipe or well-tube, substantially as described.

7. In a rotary well-machine, the combination of a suitable pipe or well-tube, a plurality of jaws adapted to grip or rotate the pipe and at the same time permit the latter to sink gradually downward, and a plurality of springs adapted and applied as backings for the jaws, whereby the latter are capable of automatically adjusting themselves to differences or inequalities in the diameter of the pipe or well-tube, substantially as described.

8. In a rotary well-machine, the combination of a suitable pipe or well-tube, gripping-jaws formed of endless link belts or chains, suitable mountings or supporting members upon which said chains are mounted, slides carrying said mountings or supporting members, a rotary turn-table upon which said slides are mounted, and coil-springs interposed between said mountings or supporting members and said slides, whereby the said chains or link belts are capable of automatically yielding and adjusting themselves to enlargements or inequalities in the diameter of the piping or well tube, substantially as described.

9. In a rotary well-machine, the combination of a suitable pipe or well-tube, a plurality of gripping-jaws provided with endless link belts or chains, removable biting or wear pieces mounted upon said chains or link belts and adapted to bite or engage the pipe or well-tube and a rotary turn-table upon which said jaws are adjustably mounted, substantially as described.

valve 65 is of the puppet type and is arranged to cover and uncover the opening leading into the cylinder. It is positively opened and closed; but by reason of the spring 68 it can open and relieve the compression whenever it is excessive.

The action of the valve mechanism is as follows: Assuming that the parts are in the position shown in Figs. 1 and 3, as the cams 46 and 47 are revolved the arm 60 is moved by the cam-roller 62 first in one direction, then in the other, thus imparting longitudinal movement to the valve-rod 64. As the rod moves to the right the valve 65 is lifted, owing to the engagement between the two parts of the rod or stem within the holder 66. When the rod is moved in the opposite direction, or to the left, so long as the tension on the rod does not exceed that of the spring the two parts of the rod move together; but as soon as the valve 65 is seated the remaining movement of the left-hand end of the valve-stem compresses the spring 68. It will be noted that the cams on the cam-sleeves 46 and 47 are tapered, and by shifting their position along the shafts 36 and 37 with respect to the valve-operating rollers 62 the admission and cut-off of the steam to the cylinders can be varied. This shifting of the cams is accomplished by means of the lever 53, which may be under the control of an automatic governor or may be governed manually, as occasion' demands. The particular engine shown being more especially designed for automobile-work wherein it is desirable to operate at different speeds, the shifting of the cams through the cage 50 is accomplished by a manually-actuated lever.

The valve-actuated cams and the parts directly coöperating therewith are mounted in a fluid-tight case 70, which is preferably filled to a greater or less extent with a lubricating material. Lubricant may be admitted to the case by removing the screw-threaded plug 71.

The valve mechanism illustrated and described is not claimed herein, because it forms the subject-matter of a separate application, Serial No. 158,565, filed May 25, 1903.

In accordance with the provisions of the patent statutes we have described the principle of operation of our invention, together with the apparatus which we now consider to present the best embodiment thereof; but we desire to have it understood that the apparatus shown is only illustrative and that the invention can be carried out by other means.

What we claim as new, and desire to secure by Letters Patent of the United States, is—

1. An engine which is divided into two parts, with an air-space between, the cylinders being in one part and the crank in the other, means for uniting the parts and maintaining a fixed separation, a crank-shaft, bearings for the crank-shaft mounted on the means and extensions on said means whereby the engine can be hung from a vehicle-frame.

2. In an engine, the combination of a cylinder, a crank-case which is separated from the cylinder by an air-space, separators for holding the crank-case and cylinder at a fixed distance apart, plates which are bolted to and extend beyond both the crank-case and cylinder, and means for detachably securing the crank-case and cylinder to the plates.

3. In an engine, the combination of a cylinder, cross-head guides which are separated from the cylinder by an air-space, plates to which the cylinder and guides are detachably secured, having a greater cross-sectional area in proximity to the crank-shaft for receiving the bearings, bearings supported on the plates, and extensions on the plates by means of which the engine is supported.

4. In an engine, the combination of a crank, a casing therefor, a cylinder which is separated therefrom by an air-space, a pair of oppositely-disposed plates to which the case and cylinder are detachably secured, and bearings for the crank-shaft that are carried by the plates.

5. In combination, an engine which is divided into two parts, one part consisting of a cylinder-section and the other a cross-head and crank-shaft section that is entirely closed, a pair of oppositely-disposed plates for preserving the alinement of the parts, separators for holding the sections a fixed distance apart, and extensions formed on the plates by means of which the engine is supported.

6. In an engine, the combination of a cylinder, a piston, a rod therefor, a crank-case, a tube which surrounds the rod and acts as a separator for the cylinder and crank-case and also as a packing to prevent exhaust from the cylinder passing into the crank-case, cross-heads and guides therefor located in the crank-case, and plates to which the cylinder and case are detachably secured.

7. In an engine, the combination of a cross-head, a guide therefor, an open-ended cylinder, a piston, a rod therefor, a sleeve which surrounds the rod and acts as a separator and also as a packing, a crank-shaft and bearing, a detachable piece containing a chamber which opens into the cylinder, and a plate which carries the axle-bearing and unites the guide and cylinder and also acts as a support for the engine.

8. In an engine, the combination of a cross-head guide, a cylinder, a detachable piece containing a chamber which opens into the cylinder, the guide and detachable piece being separated by an air-space, and a pair of plates for rigidly uniting the parts.

9. In an engine, the combination of two or more integrally-formed cylinders, a chambered projection formed thereon which acts as a brace and also to receive the exhaust, a crank-case, separators between the cylinders and the case, and side plates to which the cylinders and case are detachably secured.

10. In a single-acting engine, the combination of two or more cylinders which have exhaust-ports at one end and are open at the other, a transversely-extending piece which closes in the cylinders, piston-rods extending through the piece, cross-head guides, separators which hold the guides at a fixed distance from the cylinder, and side plates which unite the cylinders and the guides.

11. In an engine, the combination of a plurality of cylinders, a steam-chest formed integral therewith which acts as a brace for one end, ports opening from the chest into the cylinders, and a chambered projection formed on the opposite end of the cylinders which acts as a brace for the said end and also to receive the exhaust.

12. In an engine, the combination of a plurality of cylinders which are rigidly united, the outer cylinder being provided with slotted projections, a closed crank-case, and a pair of side plates which pass through said slots and are bolted to the cylinders and the case, and crank-shaft bearings which are also carried by the side plates.

13. In an engine, the combination of a plurality of cylinders, a crank-case, a partition formed in the case which acts to strengthen the same and also to support a crank-shaft bearing, and side plates which unite the cylinder and case and also support the outer ends of the crank-shaft.

14. A single-acting engine comprising a piston, a cylinder therefor which is open at one end, a crank-casing supported in alinement with the cylinder and separated from the open end thereof by an air-space, and means covering the open end of the cylinder for preventing air from cooling the piston and walls of the cylinder.

In witness whereof we have hereunto set our hands this 16th day of May, 1902.

ELIHU THOMSON.
AUGUSTUS A. BALL, Jr.

Witnesses:
JOHN G. CALLAN,
DUGALD McK. McKILLOP.